(12) United States Patent
Boll (10) Patent No.: US 7,862,338 B2
(45) Date of Patent: Jan. 4, 2011

(54) TRIPOD GRIP TRAINING DEVICE

(76) Inventor: Barbara Lee Da Boll, 2900 Mayfield Ave., La Crescenta, CA (US) 91214

( * ) Notice: Subject to any disclaimer, the term of this patent is extended or adjusted under 35 U.S.C. 154(b) by 781 days.

(21) Appl. No.: 11/899,318

(22) Filed: Sep. 4, 2007

(65) Prior Publication Data

US 2007/0298388 A1     Dec. 27, 2007

Related U.S. Application Data

(63) Continuation-in-part of application No. 29/243,851, filed on Nov. 30, 2005, now Pat. No. Des. 553,188.

(51) Int. Cl.
   *G09B 11/02*     (2006.01)
(52) U.S. Cl. .................................... 434/166
(58) Field of Classification Search .............. 434/162, 434/166, 247, 258; 446/267, 490; 482/44, 482/49, 91; D19/41, 42, 45, 54
   See application file for complete search history.

(56) References Cited

U.S. PATENT DOCUMENTS

| 105,001 | A | * | 7/1870 | Sanborn .................. 248/118.5 |
| 3,947,977 | A | * | 4/1976 | Bishop ....................... 434/166 |
| 4,832,604 | A | * | 5/1989 | Rusk .......................... 434/166 |
| D318,295 | S | * | 7/1991 | Sze ............................. D19/55 |
| 5,143,463 | A | * | 9/1992 | Pozil et al. ..................... 401/6 |
| 5,468,083 | A |   | 11/1995 | Chesar |
| D432,168 | S | * | 10/2000 | Provda ........................ D19/55 |
| 6,315,476 | B2 |   | 11/2001 | Nakagawa |

(Continued)

FOREIGN PATENT DOCUMENTS

GB     2194772 A     3/1988

(Continued)

OTHER PUBLICATIONS

Triwrite Co.; "TriWrite Crayon"—3 pages (color) printed Oct. 19, 2007 from website at www.triwrite.com.

(Continued)

*Primary Examiner*—Kurt Fernstrom
(74) *Attorney, Agent, or Firm*—Christie, Parker & Hale, LLP (57) ABSTRACT

This invention provides a crayon of special external configuration arranged to facilitate the training and development of a tripod grip in the use of pencils, pens and the like. The crayon has a body which has convexly curved end portions and at least first, second and third surfaces which are defined intermediate the body end portions in such manner as to impart to the body a generally triangular transverse cross-sectional shape of a location substantially centrally between the body end portions. Those surfaces converge toward one of the body end portions. The intersections of at least two of the surfaces with each and with the body end portions are smoothly convexly curved. The body is sized in proportion to the size of a hand of an intended user so that it is best grasped between the thumb and adjacent forefinger, preferably also with the cooperation of the adjacent middle finger, for manipulation to make a mark, thereby training the user in the development and use of a tripod grip to grasp and manipulate a pencil, pen, or other more conventionally shaped writing implement.

12 Claims, 5 Drawing Sheets

U.S. PATENT DOCUMENTS

| | | |
|---|---|---|
| 6,343,885 B1 | 2/2002 | Heyne |
| D510,750 S * | 10/2005 | Ha .............................. D19/51 |
| D576,692 S * | 9/2008 | Walsh ....................... D21/680 |
| D610,614 S * | 2/2010 | Dyer ........................... D19/41 |
| D611,540 S * | 3/2010 | Li ............................... D19/55 |

FOREIGN PATENT DOCUMENTS

| WO | WO 2004/076201 A1 | 9/2004 |
|---|---|---|

OTHER PUBLICATIONS

Binney & Smith, Inc.; Crayola TaDoodles First Marks B.U.V. (80-7002)—1 page (color) printed Oct. 22, 2007 from website at www.crayolastore.com.

Binney & Smith, Inc.; Crayola Beginnings Washable Triangular Crayons 16 ct (52-016T)—1 page (color) printed Oct. 22, 2007 from website at www.crayolastore.com.

* cited by examiner

TRIPOD GRIP TRAINING DEVICE

CROSS REFERENCE TO RELATED APPLICATION

This application is a continuation-in-part of patent application Ser. No. 29/243,851 filed Nov. 30, 2005 now U.S. Pat. No. D,553,188.

FIELD OF THE INVENTION

This invention pertains to writing implements and the like which are configured to induce the use of a tripod grip by a user of the implement. More particularly, it pertains to a crayon and the like which is shaped so that effective gripping of the crayon for use requires the use of the thumb and adjacent fingers.

BACKGROUND OF THE INVENTION

Tripod grip is a term used to identify and refer to the use of the thumb of a human hand, and the two fingers adjacent to the thumb, to hold a pencil, pen or other slender, usually cylindrical, writing implement in use of the implement. The tripod grip is generally regarded as the preferred way to hold such a writing implement for effective use of the implement.

Small children with disabilities, as well as other persons with certain disabilities, have difficulty coordinating the use of the thumb and adjacent forefinger and middle finger to grasp and manipulate pencils, pens, conventional crayons and the like. Such persons, notably children, are prone to hold such implements in other ways which make it difficult for them to control movement of the implement to produce desired effects, such as legible writing or the creation of a mark at a desired place on a paper, e.g. Physical therapists increasingly believe that children who have problems with finger coordination and manual dexterity can best overcome such problems by picking up articles which are sufficiently small that fingertips must be used, as contrasted from the whole hand including the palm. The use of large diameter crayons by such children does not help in enabling them to develop a tripod grip.

Small children, notably children in the age range from about four years old to about eight years old, usually have a natural interest in using pencils, pens and crayons to express themselves through the creation of markings or images on paper and the like. The availability of an article which can be used by small children as a form of crayon, and which is so sized and shaped to require it to be held (when used) by fingertips in different functional orientations comfortable to a user, has been found to be effective in enabling children to develop finger coordination and manual dexterity. The children perceive such articles as toys or novelties rather than as conventional writing implements, and so they use them by their own choices in preference to conventional writing implements. As a result, they acquire the ability to hold conventional implements in a tripod grip.

Products according to this invention are to be contrasted and distinguished from devices which serve as holders for pens and pencils and which are shaped to adapt them to be held in defined ways in or by a human hand. Products according to this invention also are to be contrasted and distinguished from regularly shaped specialty crayons, such as those of equilateral tetrahedronal configuration, which can be grasped in limited ways.

SUMMARY OF THE INVENTION

This invention provides an article of manufacture which is useful to train a person to use a tripod grip when grasping and manipulating a pencil, a pen or the like. The article is a form of crayon and has an irregularly shaped, elongate body of wax-based material which includes a pigment of selected color. The body has convexly curved opposite end portions, and also first, second and third exterior surfaces which are defined intermediate the body end portions and which are disposed to impart to the body a generally triangular cross-sectional shape at a location substantially centrally between the body end portions. The body surfaces converge toward one of the body end portions which has an average radius of curvature which is small relative to the average radius of curvature of the other body end portion. The intersections of at least two of the body surfaces with each other and with the body end portions are smoothly convexly curved.

Considered in another way, a tripod grip training crayon according to this invention is comprised by a unitary body of wax-based material which includes a pigment of selected color. The body is shaped generally and substantially as an elongate tetrahedron having intersecting first, second and third further surfaces. The body has opposite ends which are convexly curved, one of the further surfaces forming an enlarged first end of the body; the base surface and the other further surfaces extend substantially between the ends of the body. The intersection of the further surfaces with each other are smoothly convexly curved.

DESCRIPTION OF THE DRAWINGS

The previously mentioned and other features and benefits of products according to this invention are more fully set forth in the following description of certain embodiments of the invention, including an embodiment which is the presently preferred embodiment. That description is presented with reference to the accompanying drawings in which.

DESCRIPTION OF THE INVENTION

FIGS. 1-9 pertain to a crayon 10 which is an article of manufacture according to this invention. Crayon 10 is geometrically configured, and materially composed, to be useful as a writing implement effective to train a person to use a tripod grip when grasping a pencil, pen or other conventionally configured (i.e., generally cylindrical with a tapered operative end) writing or marking implement. A crayon or other article according to this invention has a unitary, irregularly curved body formed by a wax-based material which includes a pigment (or a mixture of pigments) of desired colors. The principal compositional component of such a body material preferably is a soy wax; beeswax is an acceptable alternate wax, and paraffin wax is a less preferred alternative wax due to its hardness. In addition to a pigment or pigment mixture, the material of a crayon body of this invention may, and preferably does, include a filler such as finely divided calcium carbonate, stearic acid as a hardener, and an additive which serves to raise the melting point of the wax.

A suitable source for the soy wax is a partially hydrogenated soybean oil available from Golden Foods/Golden Brands, Louisville, Ky., product LP416. That soy wax, when tested for hardness by use of the protocols described in ASTM Standard D1321-04, using a standard needle with an applied weight of 50 grams, and with the needle and a wax sample at 77° F., manifests a needle penetration of 2.4 mm. in five seconds. The stearic acid can be triple pressed stearic acid distributed by Purchem Trading Ltd., White Plains, N.Y., trade name Palmac 55-16. A suitable melting point elevator can be a product marketed by S&S Chemical, Inc, (see www.snschemical.com) under the trade name POLYBOOST 165 and said by that firm to have the chemical description of polymerized alkene C>10 alpha [68527-08-12]. The precise formulation of the composition of the crayon body material can vary depending upon the pigmentation desired in a particular crayon.

Figure 1:
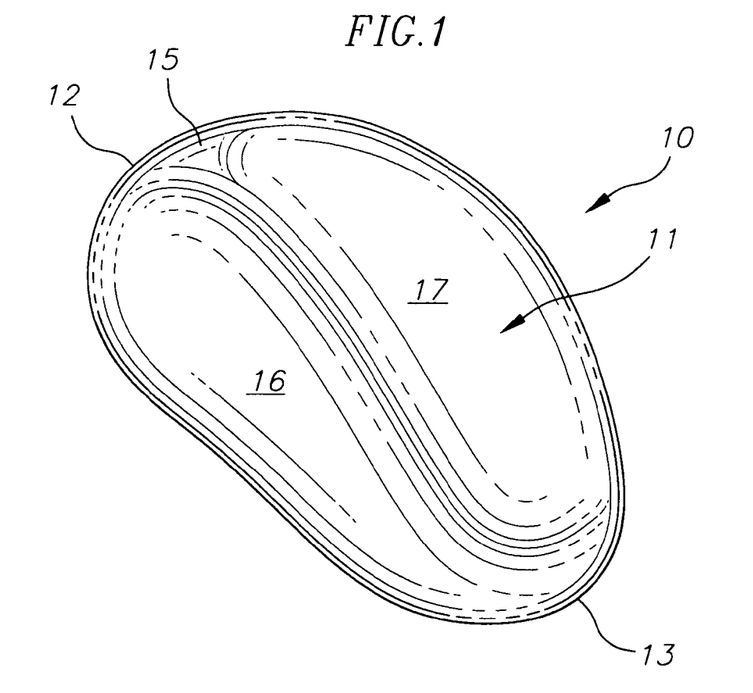
FIG. 1 is a perspective view of a first article according to the present invention.
Figure 2:
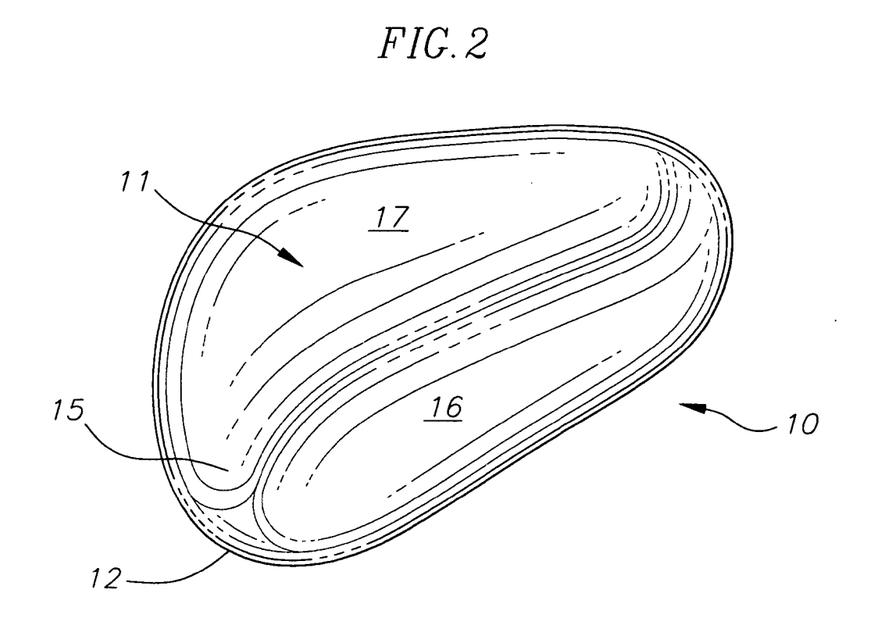
FIG. 2 is another perspective view of the first article.
Figure 3:
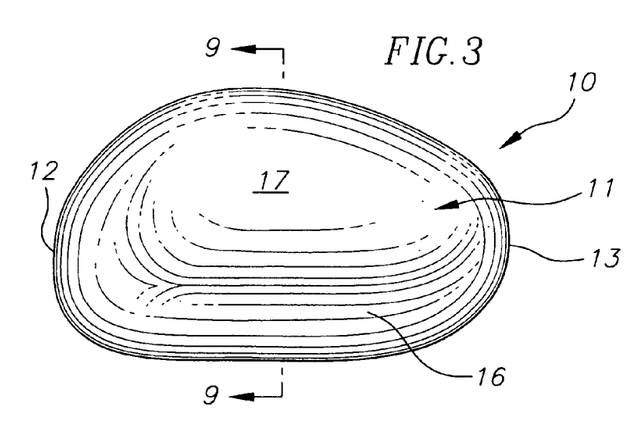
FIG. 3 is a top view of the first article.
Figures 4, 6:
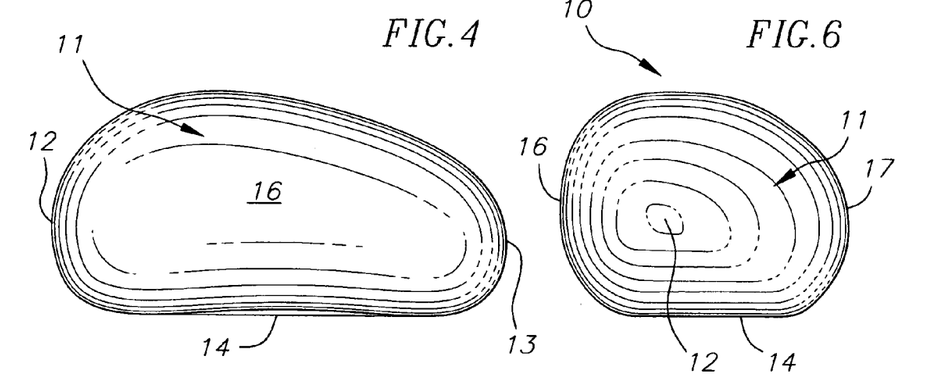
FIG. 4 is a first side view of the first article.
FIG. 6 is a front end view of the first article.
Figure 5:
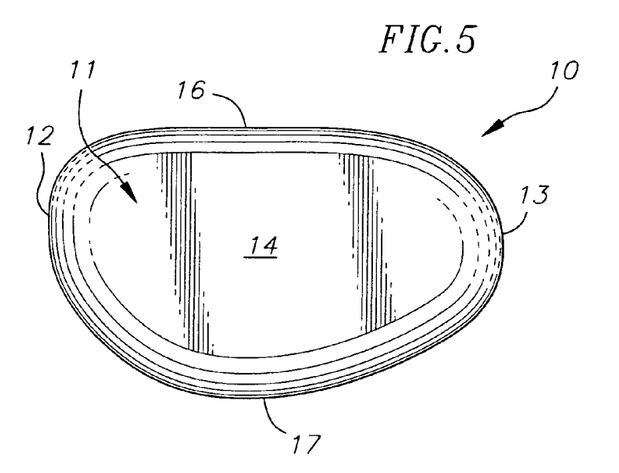
FIG. 5 is a bottom view of the first article.
Figures 7, 8:
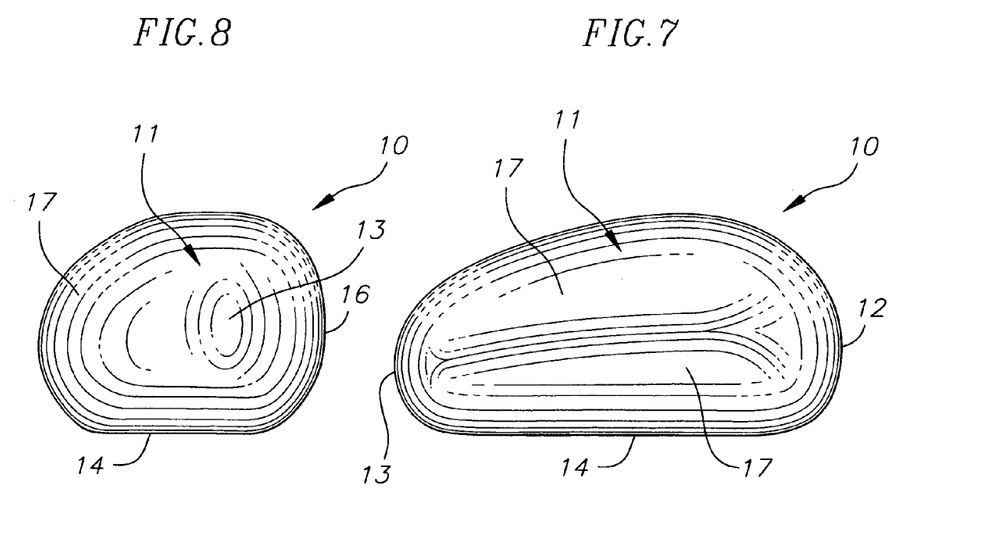
FIG. 7 is an opposite side view of the first article.
FIG. 8 is a rear end view of the first article.
Figure 9:
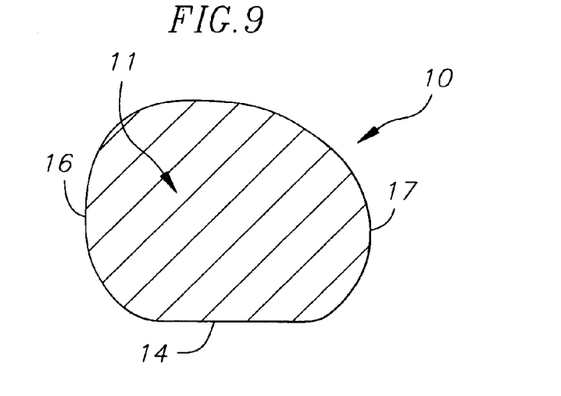
FIG. 9 is a cross-section view of the first article taken substantially along line 9-9 in FIG. 3.

As shown in FIGS. 1-9, the body 11 of crayon 10 has a shape which is assymetrical, irregular and elongate, and which can be viewed generally as an irregular tetrahedron having convexly curved ends, one of which has an average radius of curvature which is greater than the average radius of curvature of the other end of the body. Because the end portion of the crayon body can be other than spherically curved, the term "average radius of curvature" is used to describe, and compare, their shapes. Body 11 is elongate because its dimension between its opposite ends 12 and 13 is greater than any other dimension of the body. Consistent with consideration of the geometry of crayon body 10 to be generally tetrahedonal, the body has four surfaces, namely, a base surface 14, and first 15, second 16 and third 17 further intersecting surfaces. Surface 15 is a large end surface of the body and is convexly curved, preferably without being spherically curved. Surfaces 16 and 17 are side surfaces of the body. Surfaces 14, 16 and 17 define the body intermediately between its opposite convexly curved end portions and are arranged to converge toward each other proceeding from large end 15 to small end portion 16 of the body. The intersections of surfaces 14-17 of body 10 are smoothly convexly curved and so do not form meaningful edges of the body. That is, surfaces 15, 16 and 17 have intersections with each other and with the large and small end portions of the body which are smoothly convexly curved. Surfaces 15, 16 and 17 are disposed relative to each other to impart to the body, at a location substantially centrally between the body's end portions, a transverse cross-sectional configuration which is generally triangular (see FIG. 9) and with rounded intersections of the sides of the triangle. As depicted in FIGS. 5 and 6, e.g., base surface 14 of the body 11 of crayon 10 can be and preferably is substantially flat in its central position.

In an embodiment of the invention which has proved to be effective in training small children, including those having particular difficulties with muscle control, the body of the crayon has dimensions of about 1¼ inches long, about ¾ inches wide (a dimension transverse to the length and generally parallel to the base surface of the body), and about ⅝ inch high. Such a crayon is sized so that it cannot be used as a crayon when held by a child in the palm of the hand or by use of all fingers. Such a crayon is sized to require the use of the thumb and forefinger to pick it up, and the adjacent middle finger very naturally comes into use with the thumb and forefinger to form a stable grip on the crayon useful to forcefully apply the crayon to a paper or the like to create a crayon mark on the paper. Such a crayon can be held with either the large end or the small end of the body in a position for making a mark on paper. Also, such a crayon can be held in a way in which the body's base surface is engaged with the paper to make a broad or wide mark. Depending upon the particular child, after more or less experience in using such a crayon to create markings on paper, the child has developed sufficient hand small muscle control and dexterity that the child can comfortably and effectively hold and manipulate a pencil using a tripod grip. Crayons according to this invention can be provided in sizes larger than the small child size described above for use by persons having larger hands who have a need to develop a tripod grip, and in such situations the body of the crayon is sized in proportion to the size of the hand of an intended user.

A crayon according to this invention can be made conveniently and inexpensively by a casting process. That is, a mold defining a cavity shaped as a negative of the crayon body and one or more filling ports or openings into the cavity can be provided. The mold can be made of silicon rubber so that it is flexible (for removal of a cast crayon) and reusable. Melted wax of a desired color can be poured or otherwise introduced into the mold cavity, there to cool to a hard state before separation of the casting from the mold. The pouring of melted wax into the mold cavity can be a one step process, or it can be a multi-step process in which multiple pourings are made in sequence.

Figure 10:
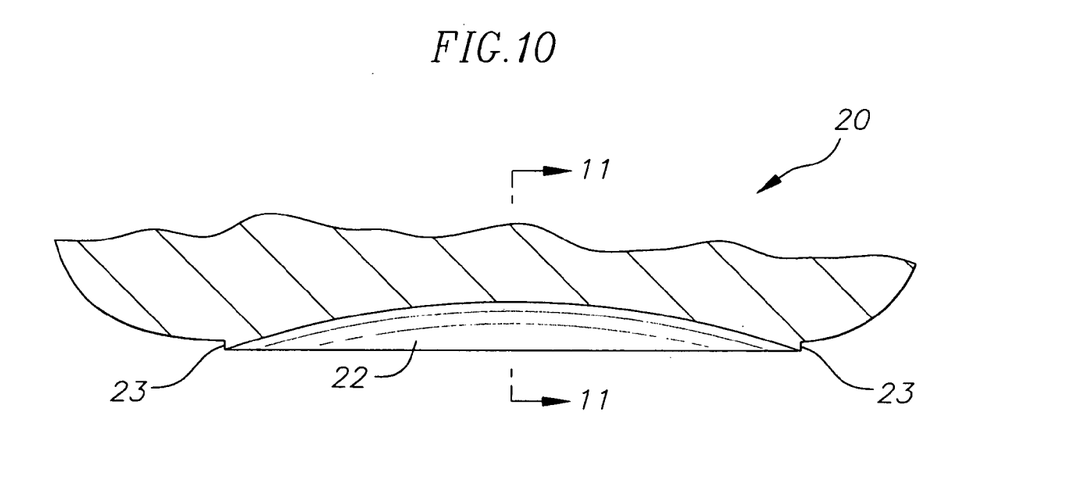
FIG. 10 is a fragmentary cross-section view, taken along line 10-10 in FIG. 11, of a second article according to the invention.
Figure 11:
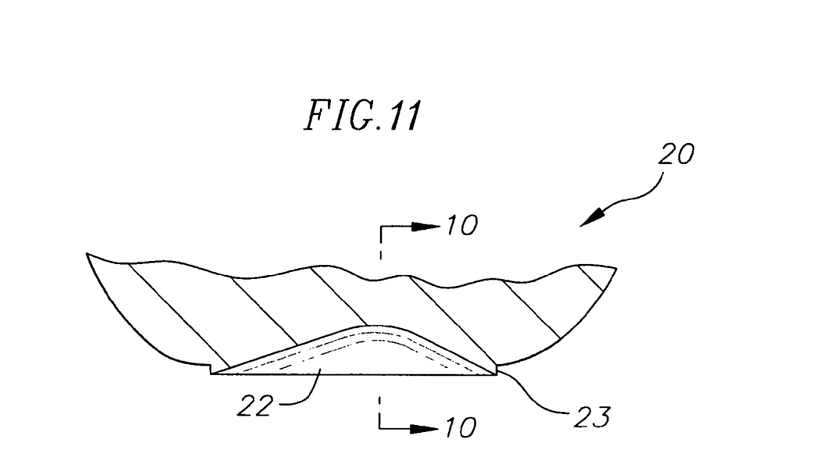
FIG. 11 is a fragmentary cross-section view, taken along line 11-11 in FIG. 10, of the second article.

Wax is known to shrink when cooling to a hardened stated from a melted state; depending upon the particular wax and any additives to it, the shrinkage factor can approach 10% or so. Crayon 10 can be made by use of a mold which has a relatively long passage in the mold to the cavity opening so that shrinkage of the wax is accommodated in the passage and the hardened wax fills the cavity to that opening and perhaps to a point above the opening. On the other hand, if a mold has a minimally long passage to the cavity opening, crayon 20 (shown in FIGS. 10 and 11) can be readily produced as a second embodiment of the invention. Crayon 20 has a body 21 in which the base surface 22 is concave, the concavity being the result of shrinkage of the wax as it hardens in the mold cavity. Base surface 22 can be bounded by a shallow shoulder 23 which is an artifact of a short filing passage to the mold cavity. Except as shown in FIGS. 10 and 11, the shape of crayon body 21 can be the same as the shape of crayon body 11.

The concave shape of base surface 22 of crayon 20 is a feature of the crayon which encourages a user to place the thumb or forefingertip there when holding the crayon. The placement of the thumb or forefingertip on concave base 22 surface of crayon 20 necessarily requires that the tips of the adjacent one or two fingers of the user's hand also be in contact with the crayon body as it is held and moved to make a mark with an end of the crayon. In that way, the development of the desired tripod grip is encouraged.

Figure 12:
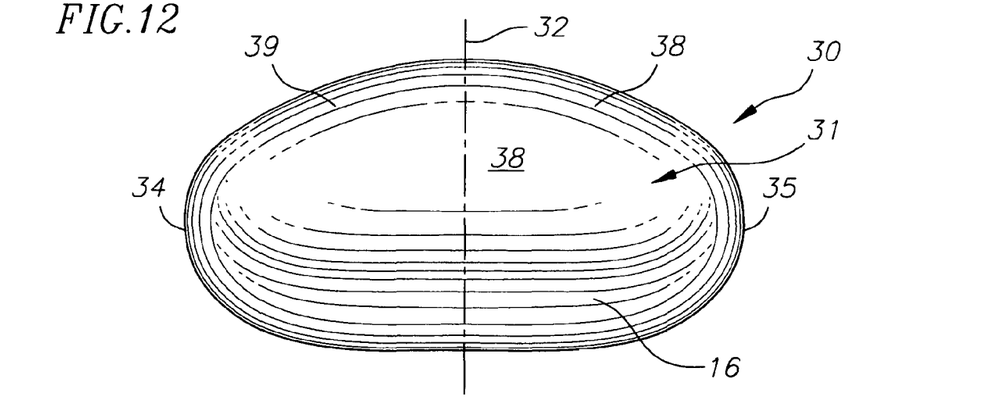
FIG. 12 is a top view of a third article according to the invention.
Figure 13:
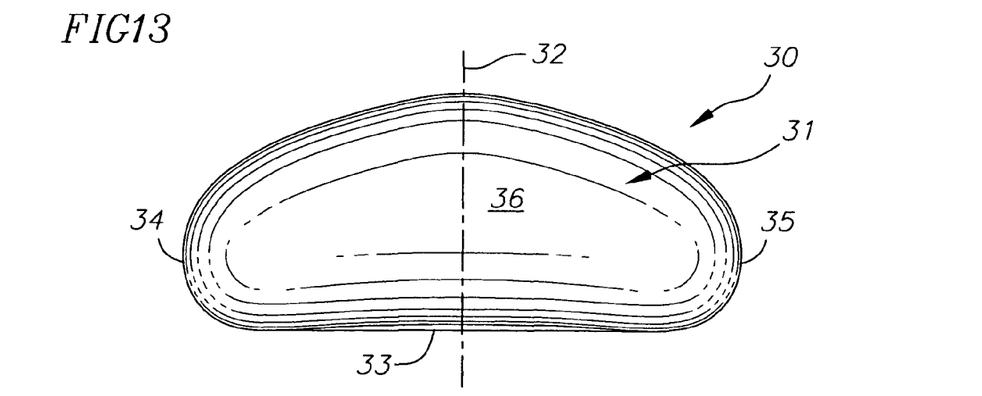
FIG. 13 is a first side view of the third article.
Figure 14:
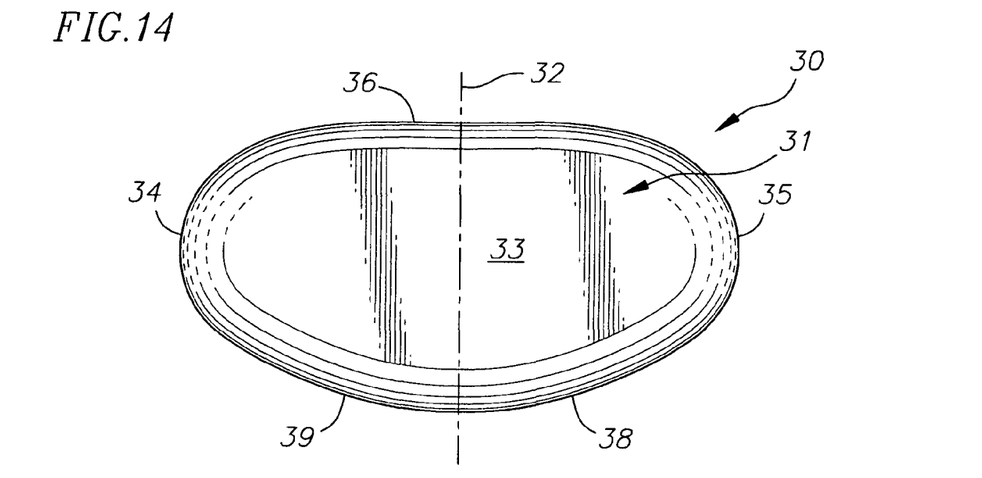
FIG. 14 is a bottom view of the third article.

Crayon 30, shown in FIGS. 12, 13 and 14, is a third embodiment of this invention. Crayon 30 has a body 31 which is bilaterally symmetrical about a plane 32 which is perpendicular to a body base surface 33 at substantially the middle of the length of body 31 between opposite end portions 34 and 35 of the body. A comparison of FIGS. 3-5 with FIGS. 12-14 reveals that the right half of crayon body 31 is substantially the same as the right portion of crayon body 11 between its small end 13 and the location of the greatest height and width of body 11. As a consequence, crayon body 31 has a base surface 33, a major side surface 36 which extends substantially between the convexly curved end portions 34 and 35, and two opposite side surfaces 37 and 38 which lie on opposite sides of the plane of symmetry of body 31 between that plane and the opposite body end portions. Those exterior surfaces of the body have intersections with each other and with the end portions which are smoothly convexly curved. The overall tetrahedronal configuration of a body of a crayon according to this invention is most clearly shown in FIGS. 12-14.

A variation (not shown, but see FIGS. 10 and 11) of crayon 30 can be a crayon having a body substantially like that of body 31 but with the central portion of the body base surface being concavely curved.

A further embodiment of the intersection can be a crayon having bilateral symmetry about its midlength, and in which the left end portion of body 11 is the basis for the symmetry of the crayon body.

The foregoing descriptions of crayons according to this invention is not intended to be, nor should it be construed as, an exhaustive catalog of all forms in which this invention can be embodied. Variations from and upon the preceding descriptions can be practiced within the fair scope and content of the invention, while having the advantages and benefits of the advances provided by the invention. The following claims are to be construed and applied in that light.

What is claimed is:

1. An article of manufacture useful for training a person to use a tripod grip when grasping and manipulating a pencil and the like,
   the article comprising a unitary body of wax-based material which includes a pigment of selected color,
   the body being shaped generally and substantially as an elongate tetrahedron having a base surface and intersecting first, second, and third further surfaces,
   the body having opposite ends which are convexly curved,
   the base surface and the first further surface extending substantially between ends of the body,
   the intersections of the further surfaces with each other being smoothly convexly curved.

2. The article of claim 1 in which the first further surface forms a large end of the body which has an average radius of curvature which is large relative to the average radius of curvature of the other end of the body.

3. The article of claim 1 in which the body is asymmetrically shaped.

4. The article of claim 1 in which the body is substantially symmetrical about its midlength.

5. The article of claim 1 in which the base surface is centrally concavely contoured.

6. The article of claim 1 in which the body material is composed principally of a wax and secondarily of a filler and the pigment.

7. The article of claim 6 in which the wax is soy wax.

8. The article of claim 7 in which the body material includes a substance which is effective to raise the melting point of the soy wax.

9. The article of claim 8 in which the substance is a polymerized alkene C>10 alpha compound.

10. A crayon useful for training a person to use a tripod grip when grasping and manipulating a pencil and the like,
    the article comprising a unitary body composed principally of soy wax and a filler and also of a pigment of selected color and stearic acid,
    the body being shaped generally and substantially as an elongate asymmetrical tetrahedron having a base surface and intersecting first, second, and third further surfaces,
    the body having opposite ends which are convexly curved,
    the base surface and the first further surface extending substantially between the ends of the body,
    the intersections of the further surfaces with each other being smoothly convexly curved.

11. An article of manufacture useful for training a person in the use of a tripod grip when grasping and manipulating a pencil and the like,
    the article comprising an irregularly shaped, elongate body of wax-based material which includes a pigment of selected color,
    the body having convexly curved opposite end portions, first, second and third surfaces which are defined intermediate the body end portions and which are disposed to impart to the body a generally triangular transverse cross-sectional shape at a location substantially centrally between the body end portions, and in which the surfaces converge toward one of the body end portions which has an average radius of curvature which is small relative to the average radius of curvature of the other body end portion,
    the intersections of at least two of the surfaces with each other and with the body end portions being smoothly convexly curved.

12. An article of manufacture useful for training a person in the use of a tripod grip when grasping and manipulating a pencil and the like,
    the article comprising an elongate body of wax-based material which includes a pigment of selected color,
    the body having opposite ends portions, intersecting first, second and third intersecting exterior surfaces which are defined intermediate the body ends, and a generally triangular transverse cross-sectional shape at a location substantially centrally between the body end portions, and in which the surfaces converge toward one of the body end portions which is convexly curved with an average radius of curvature which is small relative to an average radius of curvature of the other body end portion which is convexly curved,
    the intersections of the surfaces with each other and with the body end portions being smoothly convexly curved.

* * * * *

UNITED STATES PATENT AND TRADEMARK OFFICE
CERTIFICATE OF CORRECTION

| | | |
|---|---|---|
| PATENT NO. | : 7,862,338 B2 | Page 1 of 1 |
| APPLICATION NO. | : 11/899318 | |
| DATED | : January 4, 2011 | |
| INVENTOR(S) | : Barbara Lee Da Boll | |

It is certified that error appears in the above-identified patent and that said Letters Patent is hereby corrected as shown below:

In the Claims

Column 6, Claim 12, line 48      Delete "ends" Insert -- end --

Signed and Sealed this
Twenty-seventh Day of September, 2011

David J. Kappos
*Director of the United States Patent and Trademark Office*